W. C. DIEFENBACH.
MACHINE FOR SEWING LOOPS ONTO CARDS.
APPLICATION FILED APR. 15, 1911.

1,121,902.

Patented Dec. 22, 1914.
13 SHEETS—SHEET 1.

Witnesses:

Inventor
William C. Diefenbach
By his Attorneys

W. C. DIEFENBACH.
MACHINE FOR SEWING LOOPS ONTO CARDS.
APPLICATION FILED APR. 15, 1911.

1,121,902.

Patented Dec. 22, 1914.
13 SHEETS—SHEET 2.

Witnesses:

Inventor
William C. Diefenbach
By his Attorney

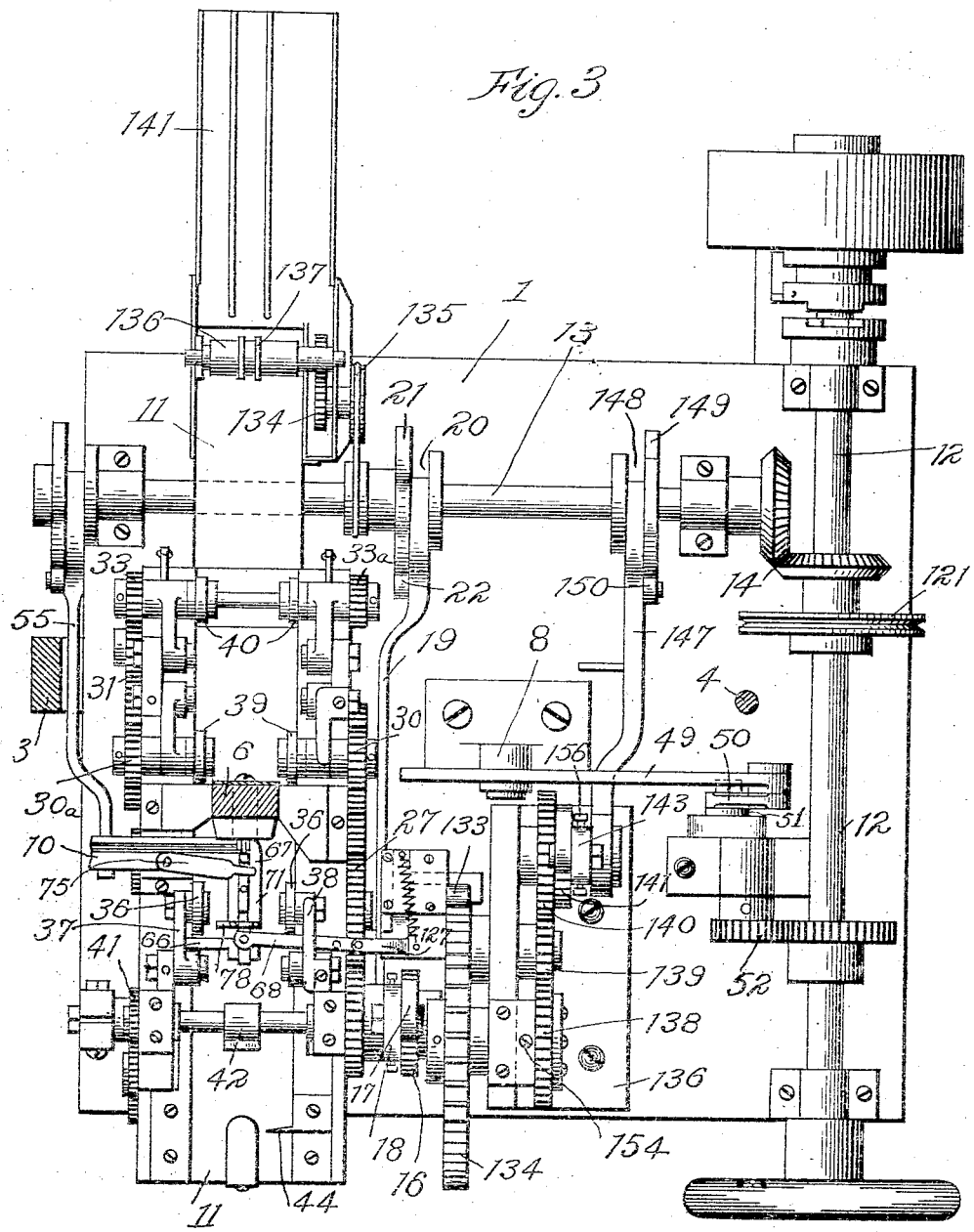

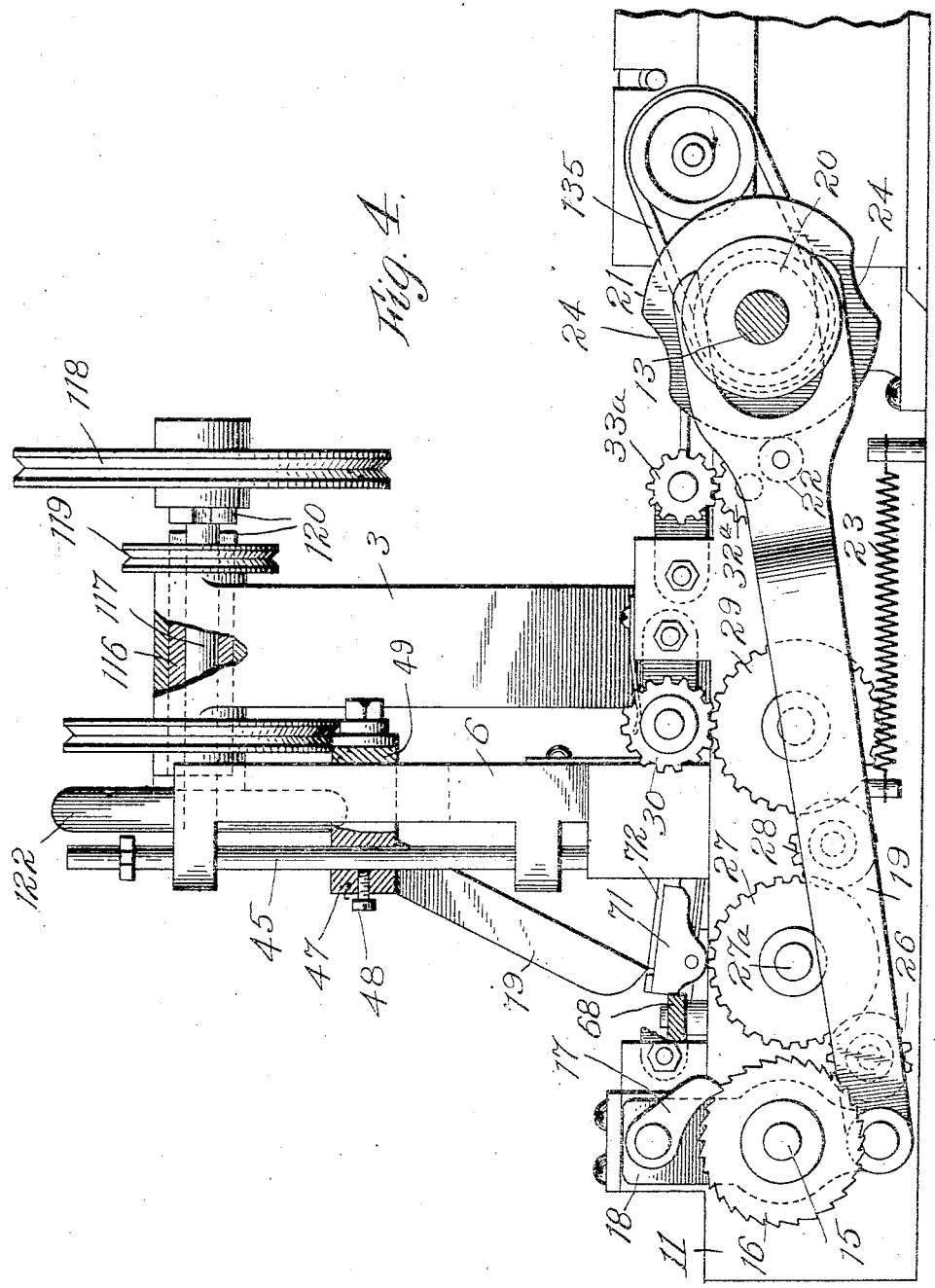

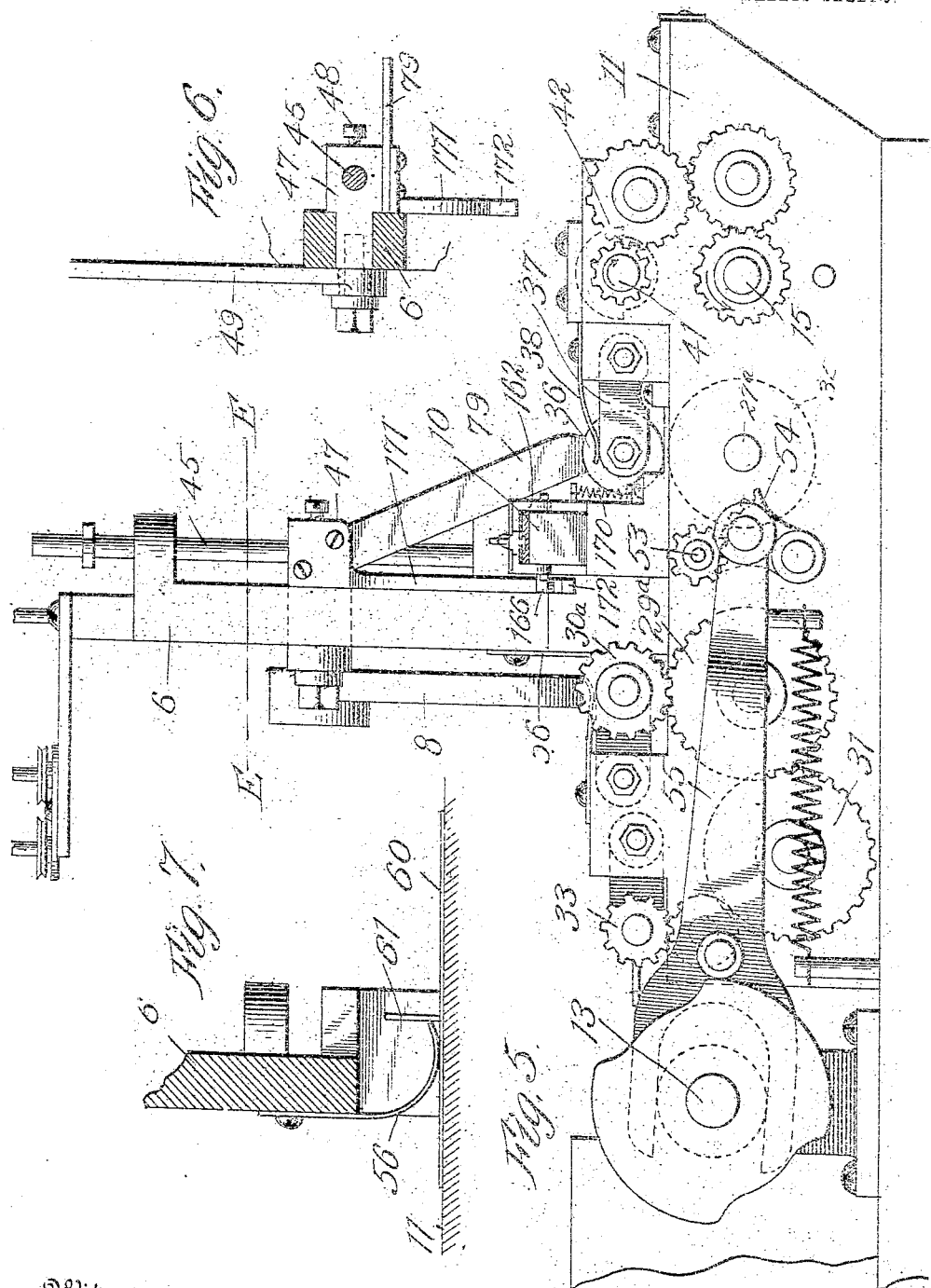

W. C. DIEFENBACH.
MACHINE FOR SEWING LOOPS ONTO CARDS.
APPLICATION FILED APR. 15, 1911.
1,121,902.
Patented Dec. 22, 1914.
13 SHEETS—SHEET 6.
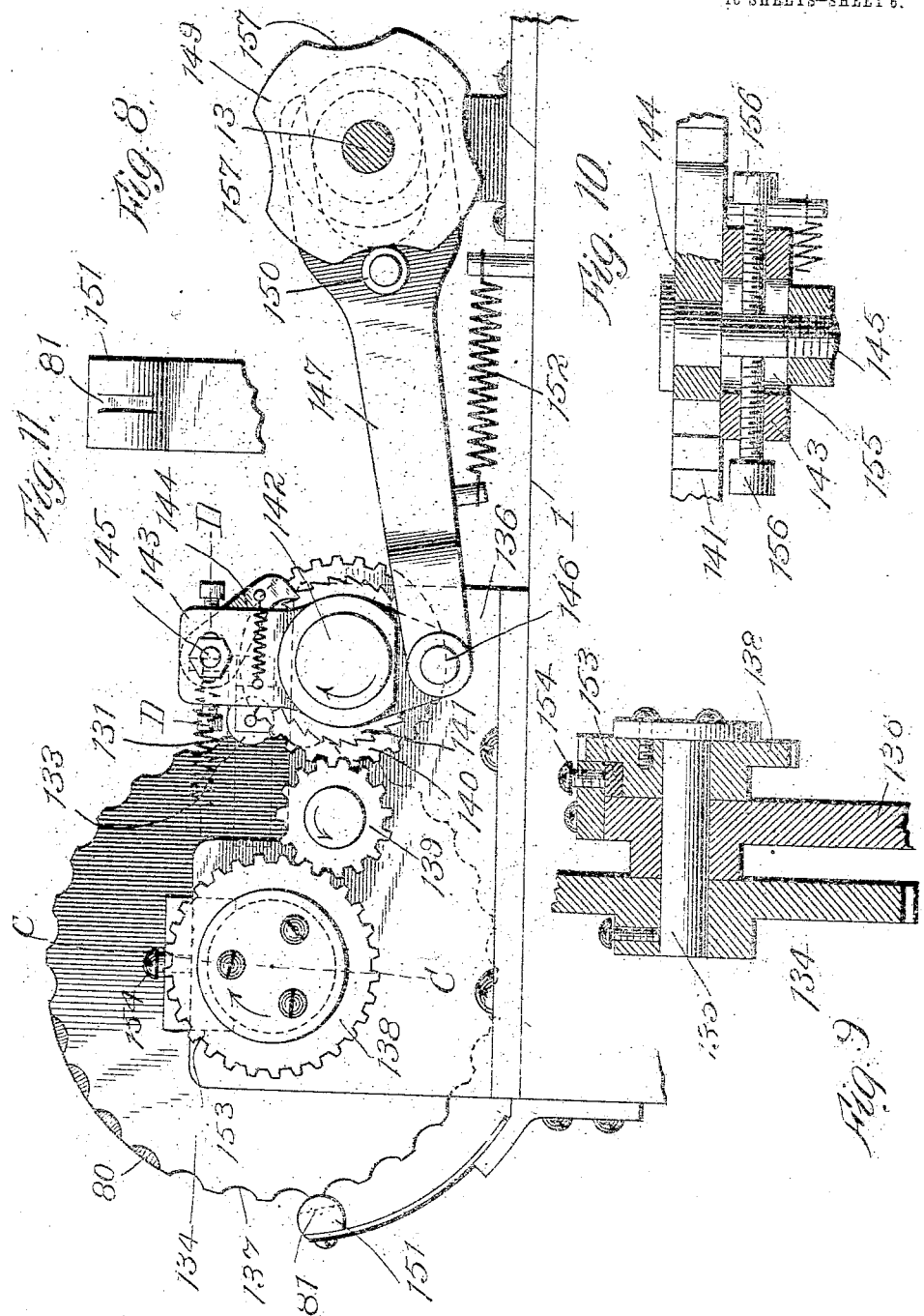
Witnesses
Inventor
William C. Diefenbach
By his Attorneys

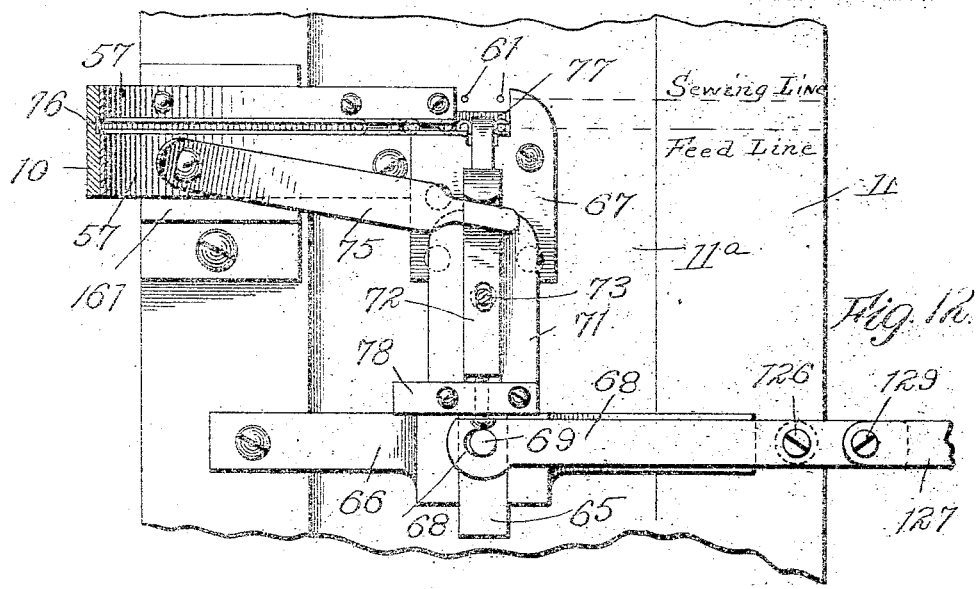

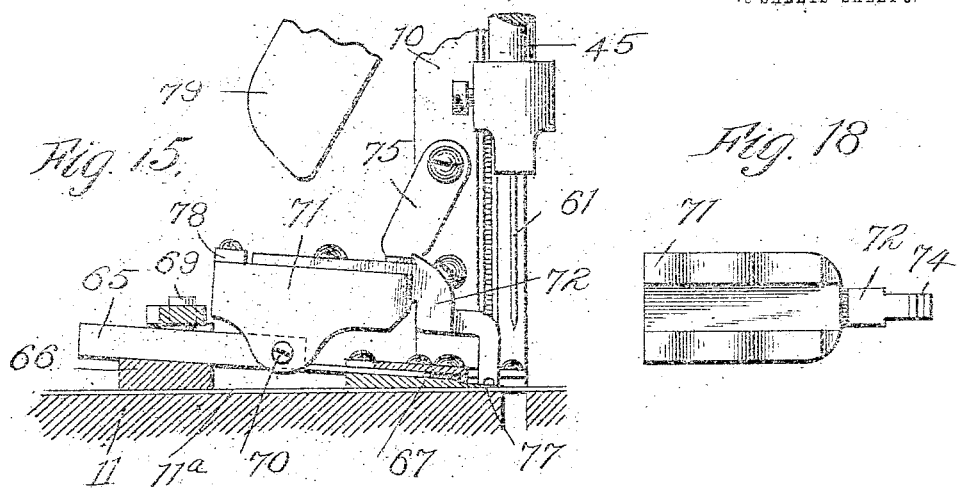
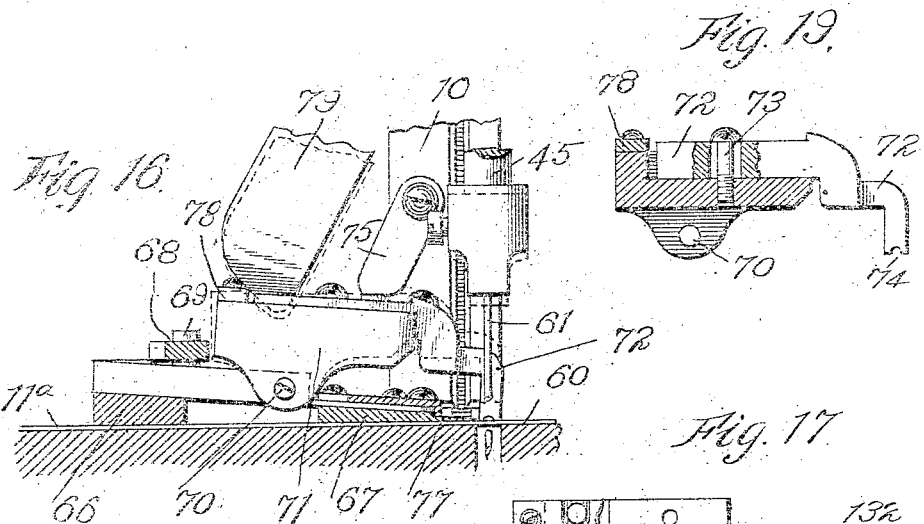
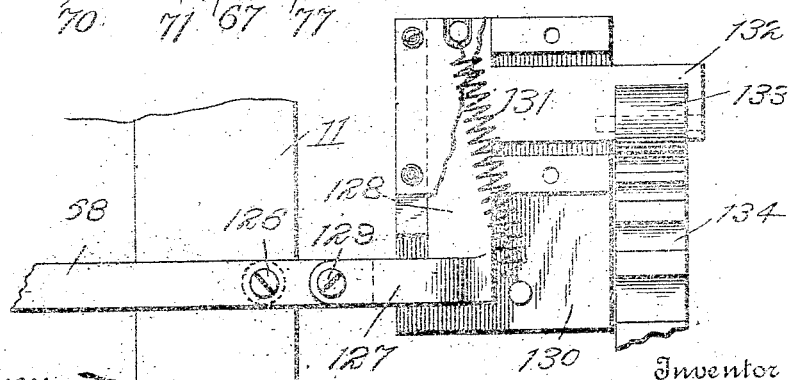

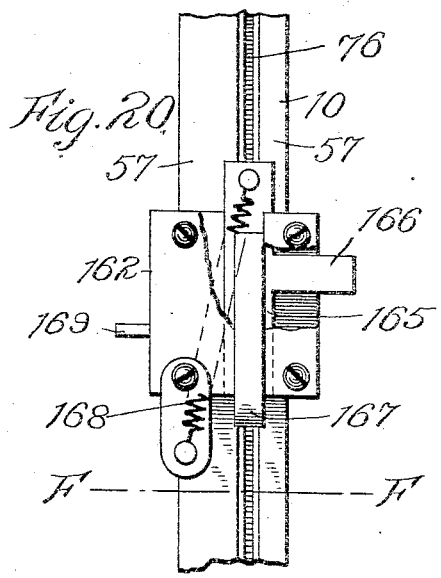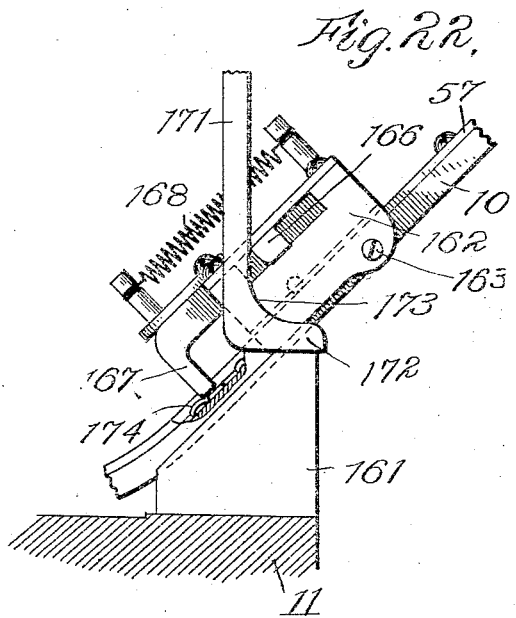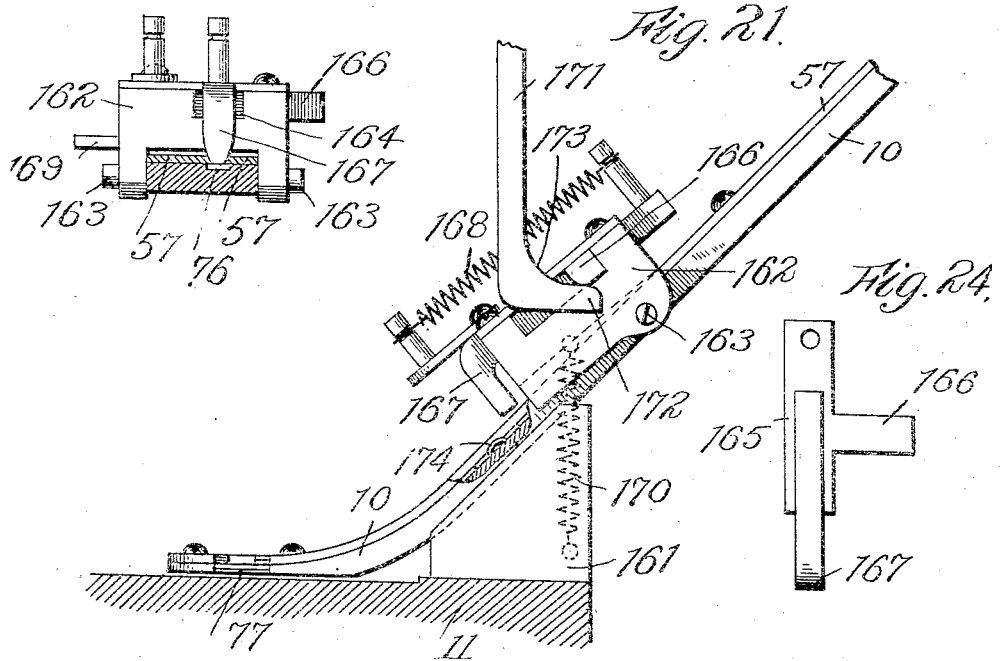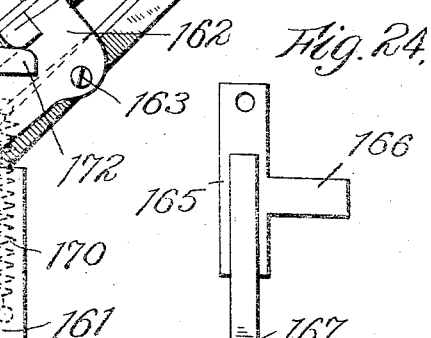

W. C. DIEFENBACH.
MACHINE FOR SEWING LOOPS ONTO CARDS.
APPLICATION FILED APR. 15, 1911.
1,121,902.
Patented Dec. 22, 1914.
13 SHEETS—SHEET 10.
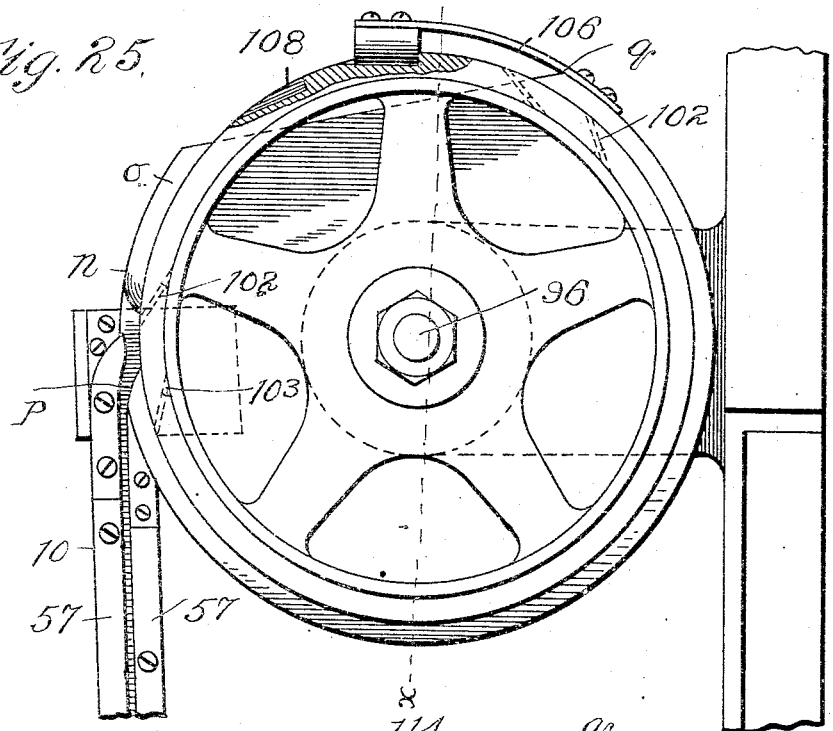
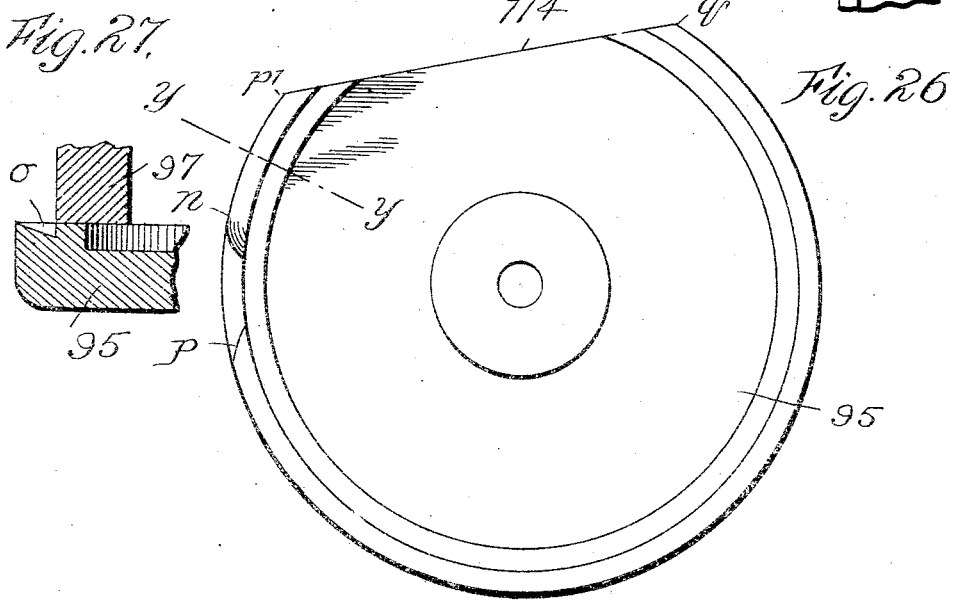
Witnesses:
Wm. A. Courtland
H. Alfred Paulke
Inventor
William C. Diefenbach
By his Attorneys

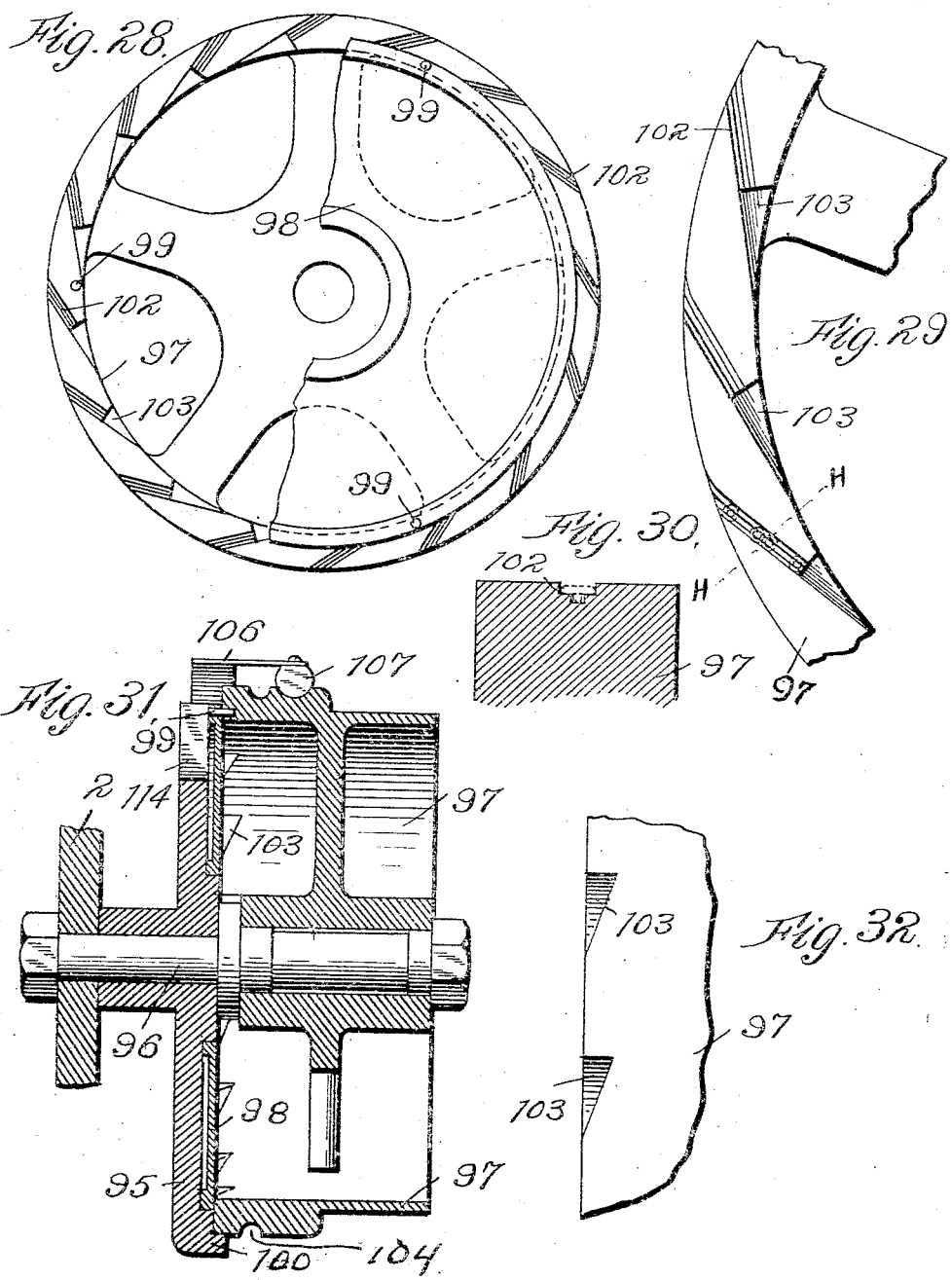

W. C. DIEFENBACH.
MACHINE FOR SEWING LOOPS ONTO CARDS.
APPLICATION FILED APR. 15, 1911.

1,121,902.

Patented Dec. 22, 1914.
13 SHEETS—SHEET 12.

Witnesses:

Inventor
William C. Diefenbach
By his Attorneys

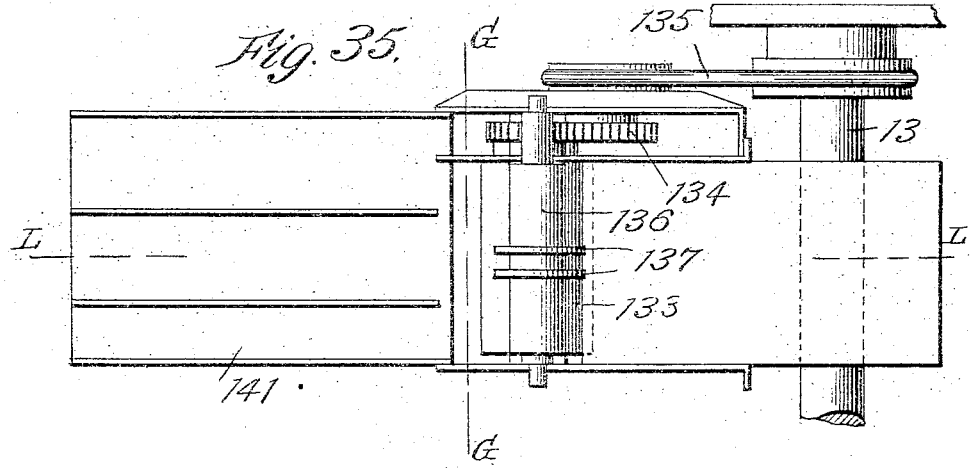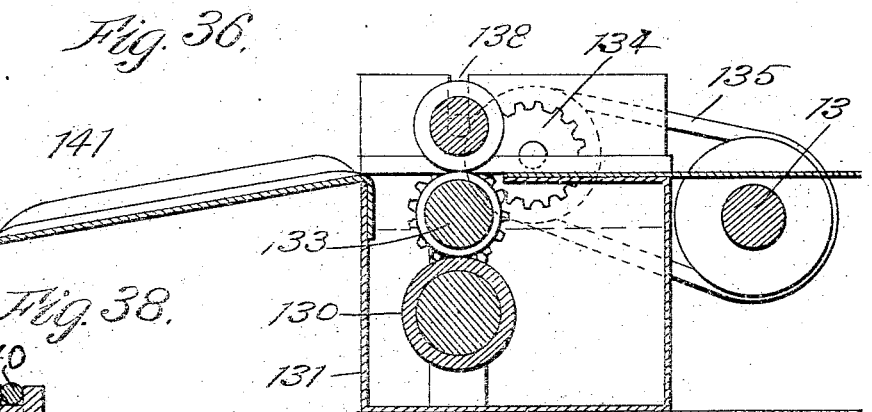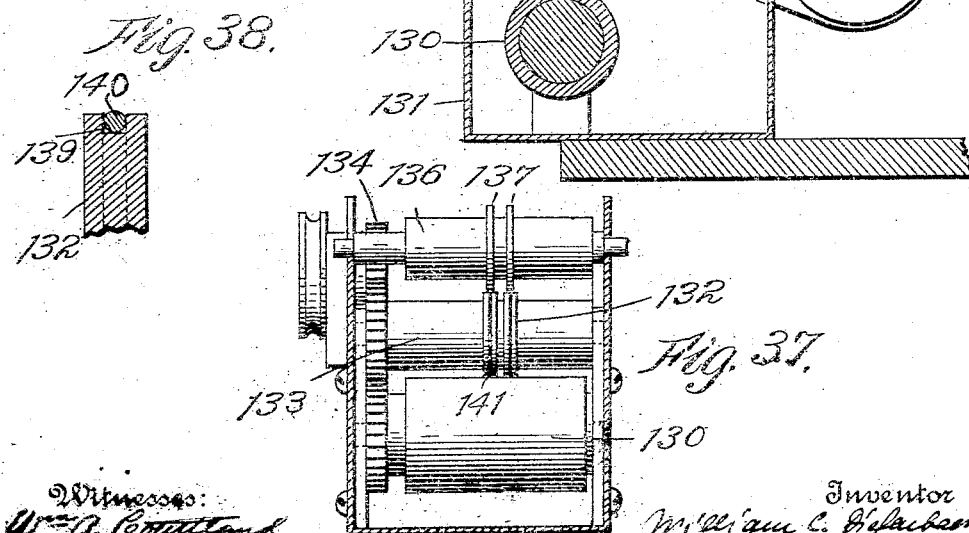

UNITED STATES PATENT OFFICE.

WILLIAM C. DIEFENBACH, OF SHELTON, CONNECTICUT, ASSIGNOR TO CONNECTICUT HOOK AND EYE COMPANY, OF WATERBURY, CONNECTICUT, A CORPORATION OF CONNECTICUT.

MACHINE FOR SEWING LOOPS ONTO CARDS.

1,121,902.      Specification of Letters Patent.      Patented Dec. 22, 1914.

Application filed April 15, 1911. Serial No. 621,259.

*To all whom it may concern:*

Be it known that I, WILLIAM C. DIEFENBACH, a citizen of the United States, and residing at Shelton, county of Fairfield, State of Connecticut, have invented certain new and useful Improvements in Machines for Sewing Loops onto Cards, of which the following is a full and clear specification, illustrated in the accompanying drawings, the novel features of the invention being more fully pointed out in the annexed claims.

My invention relates in general to machines for sewing articles onto cards, which are sold in quantities such as for instance one or two dozen on one card and in particular to a machine by means of which so-called loops are sewed onto cards in suitable quantities as demanded by the trade.

The object of the invention is to obtain a reliable feeding of loops in a predetermined position from the bulk and to positively feed the loops thus supplied singly into sewing position to be sewed onto the cards.

In the accompanying drawings I have illustrated how my invention may be reduced to practice.

Figure 1:
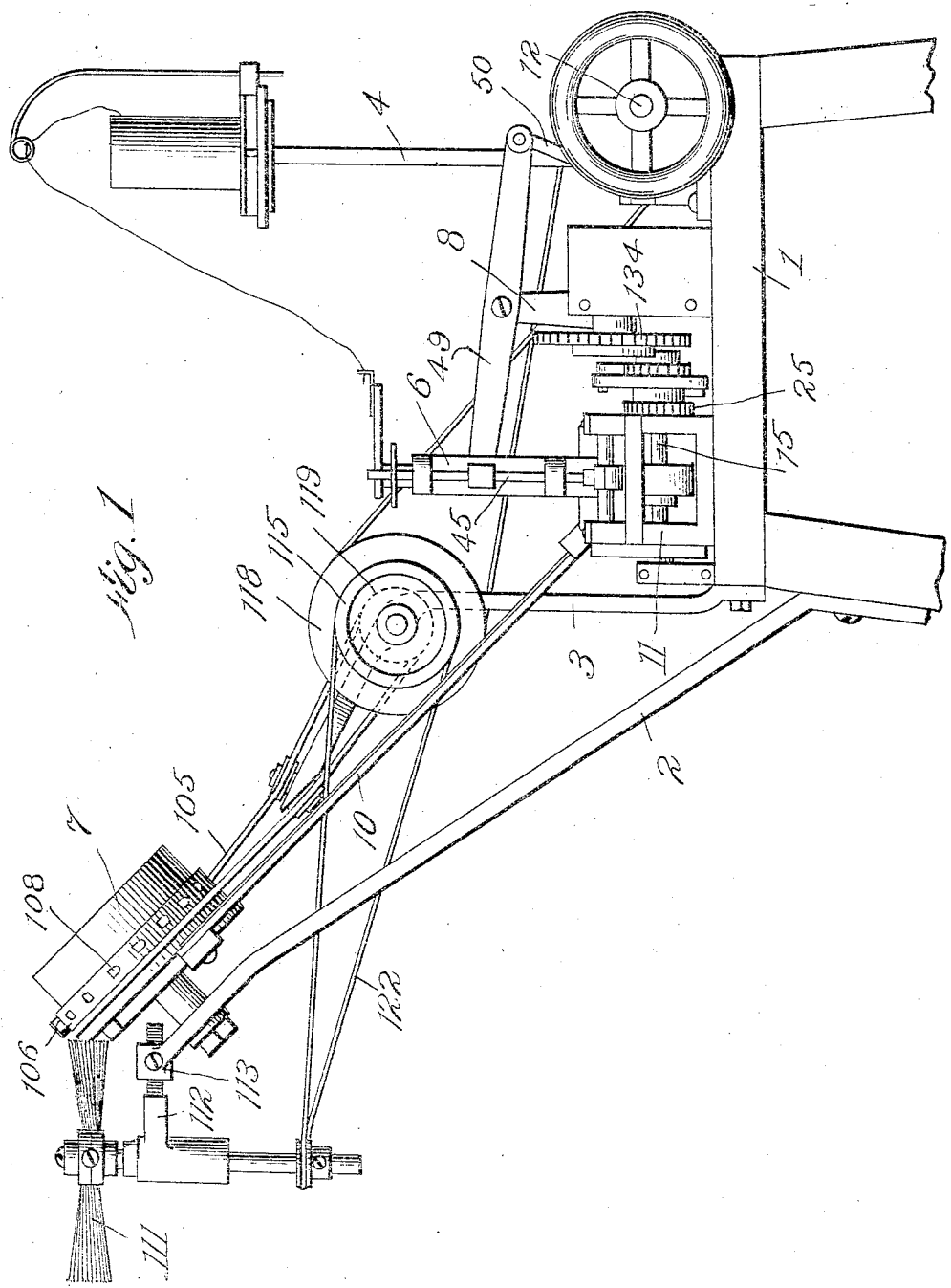
Figure 2:
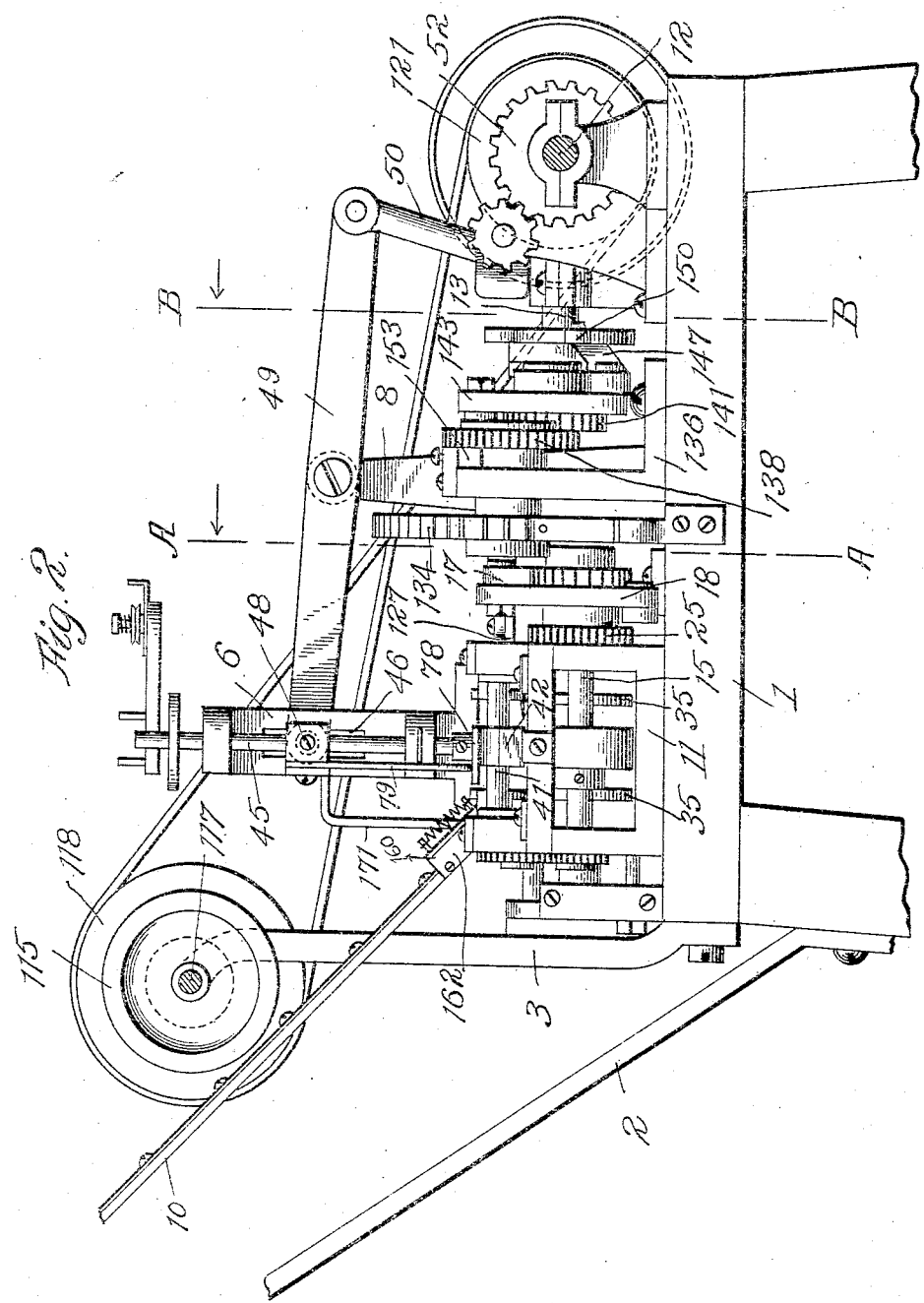

In these drawings Figure 1 is a front elevation of the machine in its entirety on a reduced scale. Fig. 2 is an enlarged front elevation of a machine with the loop hopper removed showing the parts in their mutual relation to each other. Fig. 3 is a plan view of the complete machine with the needle bar standard removed for clearness. Fig. 4 is a vertical section on the line A—A Fig. 2, looking to the left, and shows particularly the card feeding means, the needle bar standard and the means for controlling the driving of the loop hopper. Fig. 5 is a side elevation of the machine looking to the right in Fig. 2 with the hopper controlling pulleys removed. Fig. 6 is a detail plan view partly in section on the line E—E, Fig. 5, showing how the needle bar and needle bar block are oscillated. Fig. 7 is a detail view of a spring foot which is employed to hold the card against the bed while the needle is being withdrawn after the stitches are made. Fig. 8 is a vertical section on the line B—B Fig. 2 looking to the left, showing the means for operating the loop feeder. Fig. 9 is a vertical section on the line C—C, Fig. 8, seen from the left.

Figure 33:
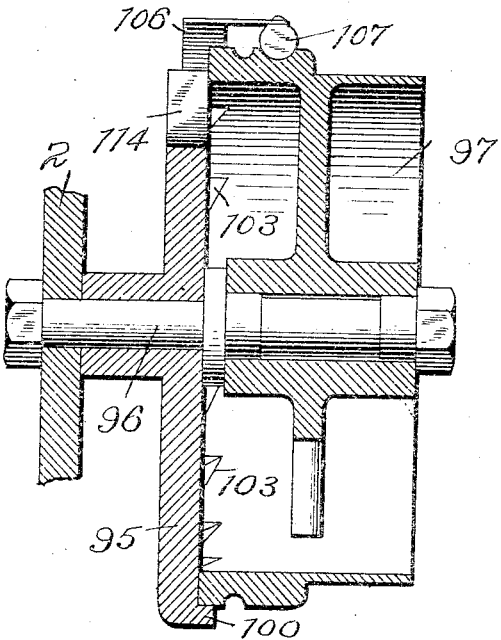
Figure 34:
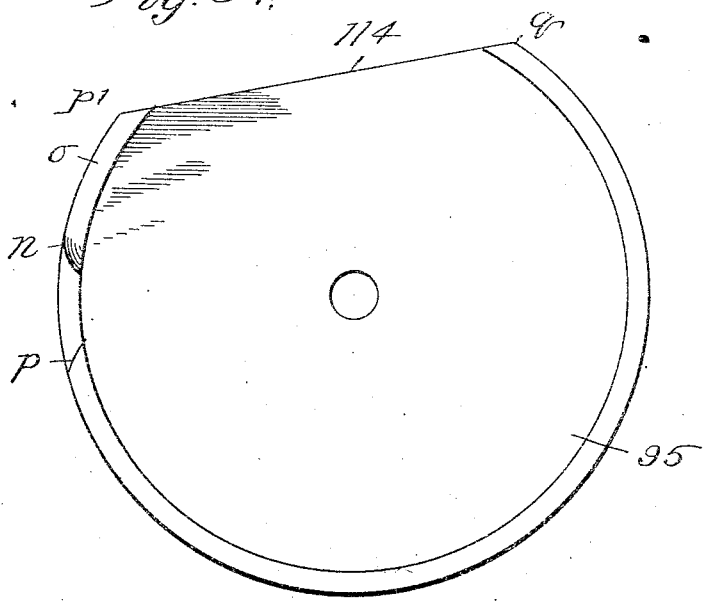

Fig. 10 is a horizontal section on the line D—D in Fig. 8, showing the means for adjusting the feeding pawl. Fig. 11 is a detail view of the block used on the detent spring shown in Fig. 8 for retaining the feed wheel in position. Fig. 12 is a plan view in detail of the lower end of the chute showing a loop in position to be carried forward by the feeder foot to sewing position. Fig. 13 is a similar view but showing the positions of parts after the feeder foot has carried the loop forward to sewing position. Fig. 14 is a detail plan view of the lower end of the loop chute with the feeder foot removed. Fig. 15 is a detail view of the lower end of the loop chute of the needle bar and the feeder foot showing the feeder foot after it has seized the loop on the feed line and about to carry it forward to sewing position. Fig. 16 is a similar view to Fig. 12 but showing the feeder foot after it has carried the loop forward to sewing position and also showing it in dotted position after the needles have passed through the sewing eyes of the loop. Fig. 17 is a plan view in detail showing how the feed wheel operates the lever for moving the feed foot to and from sewing position. Fig. 18 is a bottom view of the rocker member carrying the feed foot. Fig. 19 is a longitudinal vertical section of the same showing how the feed foot is adjustably mounted on the rocker member. Fig. 20 is a plan view in detail of the loop chute and the auxiliary feeder mounted therein for pushing the loops down the chute into the position to be seized by the feeder foot. Fig. 21 is a side elevation of the same and looking to the right in Fig. 20, showing the parts in elevated position and the pusher finger about to descend back of the hump of a loop. Fig. 22 is a similar view to Fig. 21 but showing the parts in lowered position after the pusher finger has moved a loop down the chute. Fig. 23 is a section on the line F—F in Fig. 20, seen in the direction of the arrow. Fig. 24 is a detail plan view of a pusher finger. Fig. 25 is a plan view of the loop feeding hopper and a portion of the upper end of the chute showing how the loops are discharged from the hopper and dropped down said chute. Fig. 26 is a plan view of the stationary portion or base plate of the hopper. Fig. 27 is an enlarged detail section of said base plate on the line y—y Fig. 26. Fig. 28 is a bottom view of the rotatable member of the loop hopper showing the grooves through which the loops pass in order to reach the loop chute. Fig. 29 is an enlarged detail view of a portion of the same. Fig. 30 is a detail section on the line H—H Fig. 29. Fig. 31 is a vertical section of the loop hopper on the line x—x Fig. 25. Fig. 32 is a detail inside view of the side wall of the rotatable member of the loop hopper. Fig. 33 is a vertical section view of the hopper similar to Fig. 31 but of a modified form of the same. Fig. 34 is a plan view of the inside surface of the base of the hopper, shown in Fig. 33. Fig. 35 is a plan view of a device for applying paste to the sewing threads after the loops have been sewed to the cards. Fig. 36 is a section of the same on the line L—L, Fig. 35. Fig. 37 is a vertical section on the line G—G looking to the right, Fig. 35. Fig. 38 is a detail sectional view of a portion of a gum applying roller showing the rubber inserted in the same.

Referring to Fig. 1, 1 is the main supporting table on which the principal elements of the machine are mounted. 2 is a bracket attached to the table and rising laterally therefrom at a suitable angle, on which bracket the loop hopper 7 to be described in detail later on, is mounted. On the table 1 are also mounted standards 3 and 4 the former carrying the pulleys and clutch mechanism for controlling the operation of the hopper, the latter standard carrying the thread spool from which thread is supplied to the sewing mechanism. Moreover on the table are mounted the needle bar standard 6 and the standard 8 which carries the arm 49 for operating the needle bar. 11 is the sewing table to which the loops are guided from the hopper by means of chute 10. The several devices are driven from two shafts as shown in Fig. 3, the main shaft 12 and the sub shaft 13, driven from the main shaft by miter gears 14.

The principal devices, through the coöperation of which the loops are fed from the bulk to the card and sewed thereon, are as follows: The card feeding device; the sewing device; the loop feeder; the auxiliary feeder; the loop hopper, and the pasting device; and I shall hereinafter describe these several devices under these headings.

*The card feeding device.*—This device is shown in detail in Figs. 2 to 5 and it serves for advancing the cards, onto which the loops are sewed, step by step; a stitch being made after each step by the sewing mechanism, whereby a loop is sewed onto the card. In the forward portion of sewing table 11 is mounted a shaft 15 which runs transversely to the table and which carries a ratchet wheel 16 operated by feeding pawl 17 which is pivoted on rocker 18. This rocker is pivoted in turn on shaft 15 and is pivotally attached at its lower end to connecting bar 19. This bar is forked at its free end with which it rests in groove 20 of cam disk 21 mounted on sub shaft 13 as shown in Fig. 4, so that it can slide in this groove longitudinally. At one side of connecting bar 19 is provided a cam roller 22, Figs. 3 and 4, which coöperates with cam disk 21 against which it is yieldingly pressed by means of spring 23 attached to connecting bar 19. Cam disk 21 has two notches 24 into which cam roller 22 is alternately thrown by the spring pressure when disk 21 revolves and thereby connecting bar 19 is oscillated and rocking motion imparted to rocker 18 which in turn causes pawl 17 to feed ratchet wheel 16 forward clockwise, step by step. Shaft 15, Figs. 2 and 4, also carries gear wheel 25, which can be clearly seen in Fig. 2 at the right hand side of sewing table 11, which is in mesh with idler 26 from which gear wheel 27 is driven, this wheel being mounted on shaft 27ª which carries inside of the table two underfeed rolls 35 with their peripheries in line with the upper surface of sewing table 11. With these underfeeding rolls coöperate two upper feeding rolls 36 journaled in pivoted arms 37 as shown in Fig. 5, the upper feed rolls being yieldingly held against lower feed rolls by means of a spring as shown at 38 in Fig. 5. Referring to Figs. 4 and 5, the gear wheels 29 and 29ª mounted on the same shaft and disposed on either side of sewing table 11 are driven from gear wheel 27 through idler 28 and inside of the table on the same shaft with gear wheels 29 and 29ª are mounted two other under feed rolls (not shown), which are similar to those shown at 35 in Fig. 2 which coöperate with upper feed rolls 39 shown in Fig. 3. Feed rolls 39 are positively driven by means of gear wheels 30 and 30ª from gear wheels 29 and 29ª, so that a card fed between the feeding rolls is positively moved forward from either side. Feed rolls 39 are yieldingly pressed toward the table similarly to the manner in which feed rolls 36 previously described are pressed so that a description of this structure is unnecessary and will be clear from the illustration alone. Similar feed rolls 40 are mounted back of feed rolls 39, (Fig. 3) and positively driven by gear wheels 33 and 33ª through the intermediate gear wheels 31, 32 and 32ª as will be obvious from Figs. 4 and 5. By this feeding arrangement a positive forward feed, from the left to the right in Fig. 4, of the card is obtained step by step as required by the sewing process. From shaft 15, Fig. 5, a shaft 41, journaled transversely above sewing table 11, is driven and on this shaft is mounted centrally above the sewing table the so called pick up roll 42, shown in dotted lines in Fig. 5 and in plan view in Fig. 3, the periphery of which has a cut away portion so that this roll remains out of contact with the card and so that the card is only picked up and fed toward the sewing means at a predetermined time. The purpose of this construction is clearly described for instance in the patent to George Rowbottom, No. 710,517, of October 7th, 1902, where for instance a pick up roll of the character described and also a similar card feeding mechanism are shown in Fig. 4, the pick up roll being journaled at 68 in this figure.

*Sewing device.*—The sewing device is principally mounted on standard 6 which carries needle bar 45 vertically and slidingly mounted therein. This bar carries at its lower end two needles spaced apart the distance between two sewing eyes of a loop. Only one of the needles appears in the drawings, for instance in Fig. 15, where the lower end of needle bar 45 is shown in larger scale, whereas the other needle is located behind the distance of the sewing eyes as usual in that class of machines. Standard 6 has an opening or slideway cut into it as shown at 46 in Fig. 2 in which needle bar block 47 is adapted to slide in vertical direction. Through the front end of this block passes needle bar 45 and is attached thereto for instance by a screw 48 and to the rear end of this block is attached rocking lever 49 pivotally mounted on standard 8. To the other end of lever 49 is pivotally attached connecting rod 50 which in turn is driven by crank 51 through an intermediate gear drive 52 from main shaft 12. A plan view of the connection of rocking arm 49 to needle bar block 47 is also clearly shown in Fig. 6. Thus vertical oscillation is imparted to the needles from the main shaft 12 and the timing of the operation of the needle bar and of the card feed is so that after every step the card is advanced by the card feeding device, the needles make one stitch.

The looper device which is necessary to loop the thread carried through the cards by the needles is operated in similar manner as shown and described in the above named Rowbottom patent, where the looper is shown underneath the table in Fig. 4ª at 144 and 145, the shaft corresponding to shaft 145 in this figure of the Rowbottom patent being in the present application shaft 53, Fig. 5, to which oscillating motion is imparted through sector 54 driven by connecting bar 55 from sub shaft 13 in similar manner as has been described with reference to connecting bar 19 which drives the card feeding mechanism previously described. In Fig. 7 the lower end of needle bar standard 6 is shown in detail and it will be noted that at this end a spring 56 is attached to the standard which presses against a card 60 on table 11 close to the line where the needles 61 enter the card to prevent the card from being lifted off the table when the needles are withdrawn therefrom.

*The loop feeder.*—This device which takes the loops from the lower end of loop chute 10 is shown in detail in Figs. 12 to 19 and its operating mechanism in Figs. 8 to 11. Its location in the machine can be clearly seen from Fig. 3. Referring first to the plan views of the feeder shown in Figs. 12, 13 and 14, the feeder is located in the central longitudinal line of the sewing table and slightly above the latter. The sewing table 11, a portion of which is shown in Figs. 12 and 13, is slightly recessed in its central portion 11ª which forms the slideway for the cards and the frame structure of the feeder is slightly elevated above this slideway so that the cards can pass underneath the feeder structure. The distance at which this structure is located above the slideway may be clearly seen from Figs. 15 and 16 where the bottom of the slideway 11ª is marked. The feeder consists of a slide 65, Figs. 12 and 13, the rear end of which is slidingly supported by a bridge 66 extending across the feeding table 11, and the front end of the slide is supported in an L structure 67 attached to the lower end of chute 10 as will also clearly appear from Figs. 12 to 14. Slide 65 is operated by means of a rocking arm 68 pivotally attached to slide 65 through stud 69 with the necessary lost motion in the pivot joint. The operation of arm 68 will be described later on. For the present it may be stated that this arm is adapted to oscillate slide 65 on its ways longitudinally of the table a suitable distance. On slide 65 is pivotally mounted as shown at 70, a rocker 71 which is clearly illustrated in Figs. 15, 16, 18 and 19. This rocker consists of a frame which has two laterally upwardly and downwardly extending flanges, the downward extending portions of the flanges being pivotally attached at 70 to slide 65 as previously mentioned, so that it can rock on the slide, whereas between the upwardly extending portions of the flanges is disposed the feeder foot 72 so that it can be longitudinally adjusted as shown at 73. This feeder foot 72 extends from frame 71 forward toward the needles 61 and downward, its lower end being suitably recessed transversely to receive the hump of a loop as shown at 74. A bottom view of rocker 71 and the feeder foot is clearly shown in Fig. 18. To the lower end of chute 10 is attached a leaf spring 75 which bears with its free end against the upper surface of the feeder foot so that this foot with its supporting rocker is yieldingly pressed toward the sewing table.

The chute 10 has a longitudinal groove 76 of sufficient width to receive the loops longitudinally therein and two guide plates 57, one covering groove 76 from each side so that a slot remains in the middle of the groove to permit access thereto and observation of the loops gliding down in the groove. The lower end of the chute to which the L portion 67 is attached, is open toward the needles 61 as shown for instance in Fig. 12, the width of the opening being equal to the length of a loop, and the bottom of the groove is at this point inclined toward the needles as shown in Figs. 15 and 16 at 77. When the feeder foot is fully retracted through the action of slide 65, its lower end rests on the bottom 77 of the chute so that its recessed portion 74 is in line with groove 76 of the chute on which line the loops glide onto portion 77 so that when foot 72 descends onto bottom 77 in the manner which will be presently described, it takes hold with its recessed portion 74 of a loop which has been delivered onto plate 77. When the feeder foot in such position is then moved toward the needles by the action of slide 65, it will be clearly seen that thereby the loop is removed from plate 77 from what will be hereinafter termed the feeding line, onto what will be hereinafter termed the sewing line on which the needles enter the cards. The mechanism for operating slide 65 is dimensioned so that the throw of the slide is equal to the distance between the feeding line and sewing line. Rocker 71 with the feeder foot 72 on card 60 in the sewing line is shown in Fig. 16. To the rear end of rocker 71 is attached a transverse abutment detent 78 which protrudes on one side beyond the lateral surface of the rocker as shown in Figs. 12 and 13. Now it is necessary that the feeder foot 72 be removed from the loop when the needles enter the sewing eyes of the loop because at this moment the needles attach the loop to the card and therefore it becomes unnecessary to further hold the loop to the card by any other means. Therefore, in order to remove the feeder foot from the loop at the moment the needles have entered the card, I provide abutment arm 79 on needle bar block 47. The manner in which this arm is attached to this block is clearly shown in Fig. 5. This arm extends rearwardly toward the rear end of rocker 71 and also downward a sufficient distance so that when the needle bar has descended a sufficient distance so that the needles have entered the card, the lower end of bar 79 abuts against abutment detent 78 of rocker 71. Fig. 16 shows arm 79 in full lines at the moment it touches abutment 78 and in dotted lines in the position in which it is when the needles have reached their lowest point. When arm 79 is moved into dotted position it will be noted that rocker 71 is depressed thereby at its rear end so that foot 72 is lifted off the loop which it has up to this time held onto the card and it will be also noted that this occurs against the tension of leaf spring 75. Now if by suitable timing the means for operating slide 65 retract the slide, abutment detent 78 glides along the rearwardly and upwardly inclined lower end of the arm 79 and thereby through the action of the spring 75 foot 72 is pressed down again, but by this time the slide 65 has been withdrawn sufficiently so that when abutment detent 78 has been thus moved away from the control of bar 79 it permits the descent of foot 72, and thereby the lower recessed portion 74 of the foot descends again on the feeding line over a loop which has been delivered on plate 77 while the feeder foot was in its forward position to deliver a loop onto the sewing line. In the meantime the needles have been withdrawn from the card and on their upward movement arm 79 has been also lifted away from rocker 71 into the position shown in Fig. 15, so that when the slide moves foot 72 again forward onto the feeding line this foot remains under the control of spring 75 and holds the loop in sewing position until the needles take charge of it, whereby the operation of arm 79 previously described is repeated. In Fig. 12 the feeder foot 72 is shown in the position in which it has descended onto a loop delivered on to plate 77, and in Fig. 13 in the position in which it holds a loop on the sewing line, and in Fig. 13 is also shown how, for instance by gravity, another loop has dropped from the groove of chute 10 onto the plate into the position to be seized by the foot on its return to the feeding line.

The manner in which slide 65 of the feeder foot is reciprocated is shown in Figs. 8 to 11 and Fig. 17. Rocking arm 68 which, as previously stated, is pivotally attached at one end to slide 65, is pivoted intermediate its two ends on sewing table 11, as shown at 126. The other, shorter, end, is pivotally attached at 129 to the offset arm 127 of sliding block 128 which is spring actuated as shown in Fig. 17 at 131 and mounted on a platform 130 adjacent to sewing table 11. Sliding block 128 is provided with an arm 132 offset in the opposite direction and at the end of this arm is mounted a contact roller 133. This roller coöperates with feed wheel 134, a portion of which is shown in Fig. 17 and a side view is shown in Fig. 8. This feed wheel, as will be seen from Fig. 9, is attached to a shaft 135 suitably journaled in an upright frame 136 fastened on the main table 1 and this wheel is provided with a suitable number of notches 137 so that through the action of spring 131 of sliding block 128 contact roller 133 falls into these notches 137 when wheel 134 is rotated, and by thus gliding from one notch to the other, oscillating motion is imparted to sliding block 128 which in turn is communicated by the means previously described, to rocking arm 68, which operates slide 65; and it will be noted that by passing from one notch into the subsequent notch, roll 133 performs one cycle of operations which corresponds to a retraction of the feeder foot from the sewing line onto the feeding line and pushing it forward onto the sewing line. Feed wheel 134 is operated by means of gear wheels 138, 139 and 140, the latter gear wheel being mounted on a stud together with ratchet wheel 141, the stud which supports wheels 140 and 141 being shown at 142 in Fig. 8. On stud 142 is also pivotally mounted feeding rocker 143 which carries at its upper end spring pressed pawl 144 coöperating with ratchet wheel 141 and pivoted at 145 while the lower end of feeding rocker 143 is pivotally attached at 146 to connecting bar 147. The latter bar is forked at its other end and coöperates with a cam groove 148 of a cam 149 which is mounted on sub shaft 13 as shown in Fig. 3. Adjacent to cam 149 connecting bar 147 carries a cam roller 150 which coöperates with the surface of cam 149 so that thereby oscillating motion is imparted to bar 147 which in turn rocks feeding rocker 143 by which ratchet wheel 141 is fed clockwise and through the intermediate gears feed wheel 134 is thus also fed clockwise. In order to prevent overthrowing of feed wheel 134 so that contact roller 133 is sure to descend into the subsequent notch, a spring pressed retaining block 151 is provided which is suitably shaped to descend into a notch 137 at the moment contact roller 133 rides over an elevated portion of feed wheel 134, so that any speed which feed wheel 134 might attain, while contact roller 133 is in elevated position, and thus offers no resistance to the feed wheel, will be checked effectually by retaining block 151, which is at this moment located in a notch. Connecting bar 147 is spring pressed as shown at 152 so that its cam roll 150 always remains in contact with cam 149. To further prevent any overfeed of feed wheel 134 I have provided a brake which is illustrated in Figs. 8 and 9. From Fig. 9 it will be noted that gear wheel 138 which is mounted on the same shaft 135 with feed wheel 134 has an enlarged hub extending toward the bearing of the shaft and on this hub rests a brake shoe 153 of suitable material for instance hard fiber or the like, which shoe is held in adjustable frictional contact by means of screw 154.

In order to compensate for any wear on pawl 144 by the teeth of ratchet wheel 141, I have provided a lateral adjustment for pivot stud 145 which carries pawl 144. This adjustment can be clearly seen from Fig. 10 which represents a horizontal section on the line D—D in Fig. 8 through the feed rocker 143 in larger scale. From this figure it will be seen that rocker 143 is provided with a horizontal slot 155 in which pivot stud 145 is disposed so that it can slide horizontally and it may be adjusted horizontally by means of adjusting screws 156 which protrude from opposite ends into slot 155.

It will be remembered from the description of the operation of the card feed and also from the operation of the needle bar that these two latter devices are timed to have the same number of cycles per unit of time so that for instance after every feeding step of the card the needles descend into the card and make each one stitch. Therefore, for each descent of the needles and also for each forward step of the card a new loop must be supplied by the loop feeder. The operation of feeding wheel 134 is such that at each step which pawl 144 feeds ratchet wheel 141 forward contact roll 131 performs one half a cycle of operation; in other words at the first step it rolls up onto the high portion of feed wheel 134, at the next step it descends into the subsequent notch. However, these two sub-steps together comprise one feeding step of the loop feed, as previously described. Cam 149 being mounted on the same sub-shaft 13 on which cam 21 which operates the card feeding mechanism is mounted and the latter cam by means of its two notches 24 causing the card feeding mechanism to feed the card forward two steps at each revolution, cam 149 is accordingly provided with four notches 157 so that at each revolution of sub-shaft 13 the loop feed performs two complete cycles or feeding steps in order to deliver for each card step forward, one loop onto the card. The machine herein described is intended to sew 24 loops in a row onto a card and therefore the feed wheel must make 24 steps in order to operate the loop feeder 24 times to deliver the desired number of loops onto the card. However at the beginning and at the end of the row of loops the sewing mechanism should make two idle stitches into the card in order to properly fasten the thread therein and consequently during these idle stitches no loops should be fed. In order to arrest the loop feeder at this period, feed wheel 134 is provided with a peripheral rib 80 which may be clearly seen from Fig. 8 and which covers 4 notches of this wheel. Feed wheel 134 is accordingly provided with 24 operative notches and ⅜ notches which are rendered inoperative by rib 80. Thus when the contact roll 133 passes over the operative notches 137 the feeding mechanism continues feeding loops whereas during the period in which the contact roll passes over rib 80 it is prevented from falling into these notches and thus the feeding mechanism is arrested. During this period two closing stitches are made in the completed card and two stitches in the subsequent card. During this idle period of the feeding mechanism, during which contact roll 133 remains on rib 80 it remains thus on the elevated portion of feed wheel 134 and thus feeder foot 72 remains retracted on plate 77 whereby it closes the end of the loop chute and prevents the discharge of loops from the chute. While through rib 80 on feed wheel 134 contact roll 133 is prevented from falling into notches 137 covered by it retaining block 151 which also cooperates with notches 137, as previously described, to prevent overfeeding should not be prevented by rib 80 from falling into the notches covered thereby. For this reason block 151, a face view of which is shown in Fig. 11, is provided with a recessed portion 81 of sufficient width and depth so as to avoid rib 80 and permit the block to fall also into the notches 137 covered by the rib. This recessed portion 81 is also indicated in dotted lines in Fig. 8.

*The auxiliary feeder.*—The loop chute 10 which, as has been above explained in connection with the loop feeder has a central groove which permits the sliding of loops down from the hopper to the loop feeder, guides the loops merely and they descend through the greater portion of the chute by gravity. The descent of the loops by gravity is also aided by the comparatively large number of loops in one row resting upon the loop which is next to descend into the loop feeder. However, in order to obtain a greater surety in the feeding of a loop from near the end of the chute onto the plate 77, Fig. 12, on which the feeder foot seizes the loop, I find it advisable to provide a positive means near the end of the chute which exerts a pushing action upon the last few loops which are located in the end of the chute, say for instance on the last six loops, whereby the last loop is positively forced out of the end of the chute onto the delivery plate 77 at the moment the feeder foot holds the previously seized loop on the sewing line in sewing position. The location of the auxiliary feeder in the machine is shown in Fig. 2 at 160 where it will be seen that it is located slightly above the point where the chute curves from the inclined direction to the horizontal direction near the sewing table. The detail construction of this auxiliary feeder is clearly shown in Figs. 20 to 24. This feeder is operated from the needle bar block in similar manner as the loop feeder previously described, so that the supply of loops from each feeder is jointly controlled by the operation of the sewing needles.

The construction of the auxiliary feeder is as follows: The lower end of chute 10, Fig. 21, is supported by block 161 so that it rests above the sewing table a suitable height to permit the passage of a card between the table and the lower end of the chute as described. Slightly above block 161 is pivotally attached to the chute a rocker 162 as shown at 163. This rocker is provided with a groove 164 running parallel to chute 10 and in vertical alinement therewith, which groove serves as a slideway for pusher 165. This pusher is shown in detail in Fig. 24. It will be noted from this figure and also from Figs. 20 to 23 that it is provided with a lateral detent 166 which protrudes at one side through a slot in rocker 162 and the front end of the pusher has a downward pointing finger 167. Pusher 165 is spring controlled by means of spring 168 fastened to the lower end of rocker 162 to the rear end of pusher 165 so that it tends to throw the pusher forward and out of rocker 162. The rocker is provided with a lateral pin 169, Fig. 23, to which is attached a spring 170, the other end of which is fixed to block 161, Fig. 21. This latter spring tends to pull the forward end of the rocker onto the chute so that the tip of finger 167 enters the loop groove of chute 10 between the two guide plates 57, as shown in Fig. 23. To needle bar block 47 is attached a lifter 171, Figs. 5, 6, 21 and 22. This lifter has an L shaped portion 172 at its lower end and it is in line with detent 166 so that the L shaped portion of the lifter is located beneath but in line with detent 166. Thus when the needle bar rises L portion 172 abuts against detent 166 and tilts rocker 162 upward and also retracts finger 167 against the tension of spring 168 in the following manner: Spring 168 is stronger than spring 170 so that when hook 171 moves upward L shaped cam 172 by abutting against detent 166 will first tilt rocker 162, because spring 170 yields first and only after the rear end of the rocker abuts against chute 10 detent 166 and with it pusher 165 and finger 167 are retracted into the rocker by detent 166 sliding along cam surface 173 of L shaped cam 172. On the return movement of the needle bar, lifter 171 descends and thereby rocker 162 is first returned onto chute 10 because in retracted position detent 166 presses at right angles against the outer end of L shaped cam 172 under the tension of spring 170, whereas, relatively to the forward movement of detent 166 the cam 172 forms an upward incline which offers a considerable resistance for spring 168 to overcome. Only after rocker 162 has been seated again pusher 165 is gradually released on further descent of lifter 171 whereby the detent 166 gradually slides up cam surface 173 until it has arrived at the vertical portion of the surface as shown in Fig. 22, where the vertical shank lifter 171 forms a stop for the further forward movement of detent 166 and thus of finger 167. Thus by imparting to the finger 167 this compound movement the following effect is obtained. In Fig. 22, where the finger 167 is shown in its extreme forward position it will be seen that it rests behind the hump 174 of a loop in the chute. Now if by the compound action just described, the finger is first lifted off the loops, then retracted, and then descends onto the chute it will descend behind the hump 174 of the subsequent loop. In Fig. 21 finger 167 is shown about to descend into the chute behind the hump of the subsequent loop. Then by the last step of the compound movement of the finger this loop is thrown forward in the chute which will cause the loop which is located in the extreme end of chute 10 to be pushed onto receiving plate 77, Fig. 12. Inasmuch as this last operation of the finger occurs during the descent of the needle bars at which time feeder foot 72 is forward of plate 77 on the sewing line, this plate 77 is free to receive a loop thus pushed out of the chute by the auxiliary feeder.

With reference to the operation of the feeder foot shown for instance in Figs. 15 and 16, a means has been described and shown in Fig. 8 in the form of rib 80 by which the operation of the feeder foot is interrupted during four successive stitches of the sewing needles for the reasons stated and it has also been stated that during this idle period the feeder foot remains in retracted position in which it is in line with the terminal of the loop chute so that no loops can slide out of the chute onto plate 77. It will be noted from the illustration and description of the auxiliary feeder shown in Figs. 20 to 24, that no means are shown by which the operation of this auxiliary feeder is also interrupted during the idle period of the feeder foot. This auxiliary feeder being directly operated from the needle bar alone, will continue performing its feeding operations during the four idle stitches of the needles but finger 167 of this auxiliary feeder, being spring pressed, will yield and easily slide over the hump of a loop which happens to be in line with it and which the finger tends to push forward if the end of the loop chute is closed by the feeder foot during its idle period.

*Loop hopper.*—This element of the machine serves for supplying loops from the bulk singly into chute 10 in predetermined position, so that they can slide in the groove of the loop chute to the auxiliary feeder. This hopper is mounted on bracket 2, Fig. 1, whereon it can rotate in a plane at an angle of about 45°. The detail construction of this device is shown in Figs. 25 to 32 and a detail construction of a modification of certain portions of the hopper in Figs. 33 and 34. The hopper consists of a stationary base plate 95, Fig. 31, which is attached to bracket 2 by means of stud 96. Rotatably mounted on stud 96 is the loop container which consists of cylindrical portion 97 open at the top, to which a bottom piece 98 is attached as for instance by screws 99, shown at the upper end of Fig. 31. Base plate 95 is shown in plan view in Fig. 26 and it will be noted that it has an elevated outer rim portion 100 within which the hopper cylinder 97 is seated as shown in cross section in Fig. 31. This rim 100 extends only part way around the periphery of the base plate, the portion of the periphery between the points $p$, $p'$ being flush with the lower edge of the rotatable cylinder 97 as shown in Fig. 27. Moreover the periphery portion between the points $n$ and $p$ is beveled inwardly in the manner shown in Fig. 27 at $o$. The purpose of this beveled portion will be explained later on. The outer portion of the base plate between the points $p$ and $n$ is level. The underside of the hopper cylinder which faces base plate 95 is provided with grooves 102 of the cross section shown in Fig. 30, which grooves run substantially tangentially to the inner periphery of cylinder 97 as shown in Figs. 28 and 29, which both represent views of the underside of cylinder 97. The cross section illustrated in Fig. 30 is taken on the line H—H, Fig. 29. However, grooves 102 do not terminate directly in the inner periphery of cylinder 97 but the periphery is notched out adjacent to such places where a groove 102 terminates as shown at 103. A view from the inside of cylinder 97 showing these notched portions 103 in full view is illustrated in Fig. 32. The purpose of these notched portions 103 is to have a scooping action on the bulk of loops contained in the cylinder when the latter rotates and the depth of such notches in the direction of grooves 102 is such that not more than two loops in line with each other may be contained in a groove 102 as shown for instance in Fig. 29. As will be seen from Fig. 30 the shape of grooves 102 is such that the loops can pass from within cylinder 97 outwardly through these grooves only in one position, which is with their convex or hump portion upwardly (the groove 102 is shown upside down in Fig. 30 to correspond with the views shown in Figs. 28 and 29). Rim 100 of base plate 95 within which cylinder 97 rotates is of such height that no loops which may have slid into grooves 112 can escape outwardly from the hopper except between the points p and p', Fig. 26, between which the rim is cut away, whereby the openings of grooves 102 are fully uncovered.

Between points p and n the upper end of the loop chute 10 is attached to base plate 95 as shown in Fig. 25 and the inner edges of the guide plates 57, previously described with reference to the loop feeder, are shaped at their upper ends adjacent to the cylinder periphery so that they are flaring outwardly and away from each other to facilitate the entering of a loop under these plates. The upper end of chute 10 is attached to base plate 95 at such point at which grooves 102 point substantially downward so that any loops which might have been scooped up by notches 103 and might have entered grooves 102 in the right position, can be discharged from grooves 102 into chute 10, wherein they descend by gravity to the auxiliary feeder. It sometimes happens that while grooves 102 pass the chute 10 the loops are not readily discharged but the discharging takes place slightly later when such groove 102 has passed the opening of chute 10. In order to prevent in case of such belated discharge, the loops from falling over the edge of base plate 95 the beveled portion o (Figs. 26 and 27) is provided into which loops, which may have been discharged from a slot after it has passed the opening of the chute, fall, whence they may be easily removed by the operator. It may also occur that one or more loops enter a groove either in right or in wrong position and by the weight of the bulk are jammed so that they will not be discharged either inwardly or outwardly. Such loops can be removed from the groove only by mechanical force and in order to avoid stopping of the machine in order to remove such obstructions from the grooves, I provide a rotating brush 111 adjacent to the hopper as shown in Fig. 1. This brush is journaled in a socket 112 adjustably secured to arm 2 as shown at 113 and is set at such proximity to the hopper that it will brush against the underside of the upper portion of the hopper cylinder where the grooves are located and in such direction that the bristles of the brush run through the grooves inwardly. In order to gain access to the grooves 102 a portion of the base plate 95 of the hopper is entirely cut away between the points p' and q, Fig. 26, so that thereby the underside of the cylinder 97 is exposed. The brush 111 then rotates in such direction that it will sweep any obstruction contained in the slots back into the hopper. The cut away portion 114 shown in Fig. 26 is also indicated at 114 in Fig. 31 and in dotted lines in Fig. 25. In the hopper shown for instance in Fig. 31, I employ a bottom plate 98 as described, which closes the hopper interior off against base plate 95 and which is fastened to the rotatable portion 97 of the hopper. This bottom plate may be omitted and the base plate 95 as shown in Fig. 33, may simultaneously form the bottom of the hopper cylinder. In this case the recess in the base plate which in Fig. 31 receives bottom plate 98, is of course also omitted. A plan view of the base plate which serves as a bottom plate is shown in Fig. 34. Also this plate may be provided with the cut away portion 114 to permit access for the brush 111 to the grooves of the hopper.

The loops of the character described are articles of exceedingly light weight and thus the slightest friction in any of the passages or grooves 102 of the hopper cylinder 97 causes them to stick and clog up such passage. While of course, through the action of the brush just described, loops which might stick in the passages 102 are removed at every revolution of the hopper, still they are not then discharged into the chute in such number as might be desirable. In order to facilitate the discharge of the loops from the slots into the chute a hammer mechanism has been provided which, by knocking at suitable intervals against the cylinder wall of the hopper, causes the discharge also of loops from the grooves which might stick therein. This hammer consists of a spring 106 attached to fixed base plate 100 (Figs. 25 and 31) the free end of which extends over a portion of the hopper cylinder 97 and carries at its free end a hammer 107. A suitable number of notches 108 are provided in the outer periphery of the hopper cylinder 97 into which the hammer 107 periodically falls when the hopper rotates. This hammer by thus striking at suitable intervals against the hopper wall loosens the loops in the slots and facilitates their discharge outwardly or inwardly as the position of the slot may be.

The hopper is driven by means of a belt 105 which fits into a groove 104 provided in the cylinder 97 as shown in Fig. 31. This belt in turn is driven from pulley 119 (Figs. 1 and 4) which is mounted on a sleeve 116 journaled in standard 3. This sleeve also carries pulley 115 which drives brush 111 by means of belt 122. It is desirable to throw the hopper out of operation at times without stopping the sewing machine for instance in case there should be an overfeed of loops from the hopper into chute 10. To permit such interruption of only the hopper operation I have provided a clutch mechanism which comprises the two dog clutch members 120, one of them being mounted on sleeve 116 adjacent to pulley 119, the other member being mounted on shaft 117, which latter is journaled within sleeve 116, so that it can slide therein longitudinally a suitable distance. On the right hand end of shaft 117 is attached pulley 118 which is driven from the main shaft 12 by means of pulley 121 (Fig. 3) and to the other end of shaft 117 is attached hand wheel 122. This intermediate drive just described, revolves comparatively slowly so that the operator can easily take hold of hand wheel 102, while it revolves, and throw dog clutch 120 into or out of engagement.

*Pasting device.*—Articles such as hooks, eyes or loops sewed on the cards by machines of the character just described, or such as shown for instance in the above named Rowbottom patent, are likely to fall off the card if the thread near the closing stitch made at the beginning or at the end of each card should break in handling the card in commerce, or if a number of articles have been removed from the card, the remaining articles will easily become detached or partially detached on account of the broken thread. This is particularly the case where the socalled chain stitch is employed for sewing articles onto cards. In turn chain stitch is more desirable for sewing such articles onto card because the sewing of this kind of stitch can be accomplished with more simple mechanism than the sewing of the socalled lock stitch. In order to avoid the fraying out of the stitches in the cards on account of broken thread, I run the underside of the cards when they leave the sewing machine with the articles attached to them, over paste rollers which are placed underneath the cards in line with the stitches. The small quantity of paste which is thus applied to the thread and the card is quickly absorbed by both, but is sufficient to prevent the fraying out of the stitches in the ordinary handling of the cards in commerce. The device for applying paste to the underside of the cards is shown in detail in Figs. 35 to 38 and the location of the device in the machine may be seen for instance in Fig. 3 in plan view. From Fig. 36 which shows a portion of the rear end of the sewing table 11, in side view, it will be noted that a paste roller 130 is mounted in a paste receptacle 131 and in contact with this roller which is submerged partially in the paste as shown, are the paste applying rolls 132, which are both mounted on the same shaft 133. Roll 130 and shaft 133 are geared together as shown and driven from a gear wheel 134, Figs. 35 and 36 which in turn is driven from subshaft 13 by means of belt 135. Coöperating with each paste applying roll 132 which are apart a distance of two rows of stitches, is an idle roll 136 which has two disks 137 which coöperate with one of the paste applying rolls 132. Between disks 137 and rolls 132 the cards run when they leave the machine, so that paste is applied to the underside of the card where the stitches are located. Roll 136 is journaled at either end in a slot 138 and is of sufficient width to press the cards against the paste applying rolls 132. The detail construction of paste applying rolls 132 is shown in Fig. 38. From this figure it will be noted that each roll is provided with a groove 139 in which a ring 140, of yielding material, for instance soft rubber, is located which will more readily apply the paste to the threads and the cards than an unyielding surface. After the cards leave the paste applying mechanism they slide out of the machine over chute 141.

What I claim is:

1. In a machine for sewing loops onto cards, the combination with means for feeding cards, means for supplying loops singly from the bulk and means for sewing loops onto cards; of a loop feeder comprising a horizontally reciprocating member and a vertically rocking feeder foot mounted on said reciprocating member and adapted to seize a loop supplied by said means and present it in sewing position to the cards.

2. In a machine for sewing loops onto cards, the combination with means for feeding cards, means for supplying loops singly from the bulk and means for sewing loops onto cards; of a loop feeder comprising a horizontally reciprocating member and a vertically rocking feeder foot mounted on said reciprocating member and adapted to seize a loop supplied by said means, convey it to said sewing means and hold it in sewing position on the card.

3. In a machine of the character described, the combination with means for feeding cards, means for supplying loops singly from the bulk to the sewing means and means for sewing a loop onto a card on a line transverse to the card; of a loop feeder comprising a member reciprocating longitudinally of the card toward and away from said sewing line and a vertically mounted feeder foot mounted on said reciprocating member and adapted to seize a loop fed by said feeding means onto a transverse line remote from said sewing line, convey it to said sewing line and hold it on said line in sewing position on the card.

4. In a machine for sewing loops onto cards, the combination with means for feeding cards, means for supplying loops singly from the bulk and means for sewing loops onto cards; of a loop feeder comprising a horizontally reciprocating member, a vertically rocking feeder foot mounted on said reciprocating member and adapted to seize a loop supplied by said means and present it in sewing position to the cards, and means for independently operating said reciprocating member, and means for controlling the rocking of said feeder foot from said sewing means.

5. In a machine of the character described, the combination with means for supplying loops singly, means for feeding cards and means for sewing loops onto cards; of a loop feeder having a reciprocating member and a rocking feeder foot pivotally mounted thereon adapted to seize a loop and present it in sewing position to the sewing means, means for operating said reciprocating member to move toward and away from the sewing means, and means coinciding in their operation with the sewing means for rocking said foot to remove it from a loop in sewing position while the sewing means attach the loop to the card.

6. In a machine of the character described, the combination with means for supplying loops singly, means for feeding cards, a sewing table and sewing needles suitably operated for sewing loops onto cards on said table; of a loop feeder having a reciprocating slide and a rocking feeder foot pivotally mounted thereon normally tending to move toward the sewing table to seize a loop supplied to it and adapted by the movement of said slide to carry said loop into and hold it in sewing position, means coinciding in their operation with said sewing needles for rocking said foot to remove it from a loop in sewing position while the needles sew the loops onto the card, and means operating independently of the sewing needles for operating said slide.

7. In a machine of the character described, the combination with a sewing table, means for feeding loops singly onto a predetermined line on said table, means for feeding cards and sewing needles suitably operated for sewing loops onto cards on a line remote from said feeding line; of a loop feeder comprising a reciprocating slide and a rocking feeder foot pivoted thereon and tending to seize a loop on said feeding line and hold it onto the table, means for operating said slide to reciprocate said foot between the feeding line and the sewing line and an abutment arm connected to and operating with said sewing needles having a suitably shaped end for rocking said foot while the needles sew a loop held by said foot onto the card to lift the foot from a loop in sewing position, said arm permitting said foot to descend on the subsequent loop on the feeding line when the needles move away from the card.

8. In a machine of the character described, the combination with a sewing table, means for feeding loops singly onto a predetermined line on said table, means for feeding cards and sewing needles suitably operated for sewing loops onto cards on a line remote from said feeding line; of a loop feeder comprising a reciprocating slide and a rocking feeder foot pivoted thereon and tending to seize a loop on said feeding line and hold it onto the table, means for operating said slide to reciprocate said foot between the feeding line and the sewing line, an abutment detent on said rocker and an abutment arm connected to and operating with said sewing needles having a suitably shaped end coöperating with said detent for rocking said foot while the needles sew a loop held by said foot onto the card to lift the foot from a loop in sewing position, said arm permitting said foot to descend on the subsequent loop on the feeding line when the needles move away from the card.

9. In a machine of the character described, the combination with a sewing table, means for feeding loops onto a predetermined line on said table, means for feeding cards, and sewing needles suitably operated for sewing loops onto the cards on a line remote from said feeding line: of a loop feeder comprising a reciprocating slide and a spring pressed rocking feeder foot pivoted thereon and tending to seize a loop on said feeding line and hold it on to said table and mechanism for operating said slide to cause said foot to convey a loop from the feeding line to the sewing line and hold it thereon in sewing position, an abutment detent on said rocker and an abutment arm connected to and operating with said needles having a suitably shaped end coöperating with said detent to lift said foot from a loop in sewing position while the needles sew said loop onto the card, said arm permitting said foot to descend on the subsequent loop on the feeding line when the needles move away from the card and the foot is shifted by the slide onto the feeding line.

10. In a machine of the character described, the combination with means for supplying loops singly, means for feeding cards step by step, a sewing table and sewing needles suitably operated for sewing loops onto said cards after a card feeding step has been completed; of a loop feeder having a reciprocating slide and a rocking feeder foot pivotally mounted thereon normally tending to move toward the sewing table to seize a loop supplied to it and adapted by the movement of said slide to carry said loop into and hold it in sewing position, means coinciding in their operation with said sewing needles for rocking said foot to remove it from a loop in sewing position while the needles sew the loops onto the card, means operating independently of the sewing needles for operating said slide, said means comprising a rocking lever attached at one end to said slide, an oscillating slide connected to the other end of said lever and carrying a contact roll, a feed wheel having notches, coöperating with said roll and means for operating said feed wheel step by step in suitable time relation to said card feeding means to shift said feeder foot into the sewing line at each card step.

11. In a machine of the character described, the combination with means for supplying loops singly, means for feeding cards step by step, a sewing table and sewing needles suitably operated for sewing loops onto said cards after a card feeding step has been completed; of a loop feeder having a reciprocating slide and a rocking feeder foot pivotally mounted thereon normally tending to move toward the sewing table to seize a loop supplied to it and adapted by the movement of said slide to carry said loop into and hold it in sewing position, means coinciding in their operation with said sewing needles for rocking said foot to remove it from a loop in sewing position, while the needles sew the loops onto the card, means operating independently of the sewing needles for operating said slide, said means comprising a rocking lever attached at one end to said slide, an oscillating slide connected to the other end of said lever and carrying a contact roll, a feed wheel having notches, coöperating with said roll and means for operating said feed wheel step by step in suitable time relation to said card feeding means to shift said feeder foot into the sewing line at each card step, and a rib on said feed wheel closing a suitable number of successive notches against said feed roll to render said foot inoperative and retain it in retracted position during a predetermined number of card steps.

12. In a machine of the character described, the combination with means for supplying loops singly from the bulk, means for sewing loops onto the cards and means for feeding a single loop to said sewing means, and a loop chute for conveying loops to said feeding means; of an auxiliary feeder disposed in said loop chute and controlled by the operation of said sewing means for positively feeding a loop to the end of said chute to said first named feeding means.

13. In a machine of the character described, the combination with means for supplying loops singly from the bulk, means for sewing loops onto the cards and means for feeding a single loop to said sewing means, and a loop chute for conveying loops to said feeding means; of an auxiliary feeder disposed in said loop chute comprising a rocking member pivotally attached to the chute having a pusher finger slidingly disposed in it, which finger protrudes into said chute, a spring tending to press the forward end of said rocking member onto the chute and a second spring tending to pull said pusher out of said member and means coincidentally operating with said sewing means for lifting said rocking member against its spring, then retracting said pusher finger, then lowering said rocking member to permit its pusher finger to engage behind a subsequent loop and then releasing said pusher under its spring tension, to feed a loop to the end of said chute to said first named feeding means.

14. In a machine of the character described, the combination with means for supplying loops singly from the bulk, means for sewing loops onto the cards and means for feeding a single loop to said sewing means, and a loop chute for conveying loops to said feeding means; of an auxiliary feeder disposed in said loop chute comprising a rocking member pivotally attached to the chute having a pusher finger slidingly disposed in it, which finger protrudes into said chute, a spring tending to press the forward end of said rocking member onto the chute and a second spring tending to pull said pusher out of said member and a lifting cam attached to and operating with the sewing means, a detent fastened to said pusher coöperating with said cam and adapted by its upward movement to first lift said rocking member against its spring tension, then retract said pusher finger and on its downward movement adapted to first lower said rocking member to permit said finger to engage behind a subsequent loop and then release said pusher finger, said up-and-downward-movement of said lifter coinciding with the upward and downward movement of the sewing means to feed a loop to the end of said chute to said feeding means while the latter convey a loop to said sewing means.

15. In a machine of the character described, a loop hopper having a stationary member and a rotatable member which contains loops in bulk, said rotatable member being provided with tangential grooves adjacent to and facing said stationary member, permitting the passage of a loop to the outside in predetermined position only, said stationary member having means adjacent to and covering the outer opening of such grooves from which a loop may be discharged by gravity, but permitting discharge of loops at a predetermined point from some of such grooves and a chute located at said point for receiving loops thus discharged, said grooves terminating at the inside of the hopper in notches, one wall of which extends in the direction of the groove and the other at right angles thereto and the latter wall facing the direction of rotation to facilitate the entering of loops into said grooves.

16. In a machine of the character described, a loop hopper having a stationary member and a rotatable member which contains loops in bulk, said rotatable member being provided with tangential grooves adjacent to and facing said stationary member which permit the passage of a loop to the outside in predetermined position only, said stationary member having a rim partway surrounding said rotatable member and covering the outer opening of such grooves from which a loop discharge by gravity is not desired, the portion of said stationary member at which said openings are exposed to permit the discharge of loops by gravity having a chute adjacent to it to receive the loops thus discharged, the peripheral portion of said stationary member beyond the point at which said chute is located protruding beyond the periphery of the rotatable member and being provided with a groove following the contour of the rotatable member and having its bottom inclined toward said member to catch loops which may be accidentally discharged from the hopper beyond the point where said chute is located.

17. In a machine of the character described, a loop hopper comprising a stationary inclined circular base plate and a cylindrical hopper rotatably disposed thereon and containing the loops in bulk and closely facing said base plate at one side and being open at the other side, said cylinder having tangential grooves in its rim facing the base plate, which permit the passage of a loop to the outside in predetermined position only, said base plate having a rim partway surrounding said cylinder and covering the outer opening of said grooves, from which a loop may be discharged by gravity, said rim having a cutaway portion in line with the main plane of the plate at which some of said discharging grooves are exposed to permit the discharge of loops therefrom, and a loop chute adjacent to said portion and having its base in line with said plate and adapted to receive the loops thus discharged, the part of said cut away portion beyond the point at which said chute is located being provided with a groove following the contour of the rotatable member and having its bottom inclined toward said member to catch loops which may be discharged from the hopper beyond the point where said chute is located.

18. In a machine of the character described, a loop comprising a circular, inclined, stationary base plate and a cylindrical hopper containing the loops in bulk rotatably disposed thereon and closely facing said plate with one of its rims, said cylinder having tangential grooves in its rim facing the base plate which permit the passage of a loop to the outside in predetermined position only, said base plate having means adjacent to the outer openings of said grooves from which a loop may be discharged by gravity for permitting such discharge at a predetermined point only, said base plate having a segmental portion of its upper half cut away to expose the face of said loop grooves and a part of the cylinder interior, and a brush rotatably disposed adjacent thereto for brushing loops sticking in said grooves back into the hopper.

19. In a machine for sewing articles onto cards, a card feeding mechanism, a sewing mechanism, and a paste applying mechanism comprising a trough containing paste and located at the end of the card feeding mechanism where the sewed cards are discharged, a paste supply roll disposed to dip into the paste and paste applying rolls in contact with said supply roll and in line with the stitches sewed into the card for applying paste to the thread at the underside of the cards to prevent fraying of the stitches and the remaining articles from becoming detached thereby when some of the articles are detached from the card, said applying rolls each having a groove in its periphery and resilient material disposed therein to yieldingly contact with said supply roll and with the cards and a coöperating contact roll for each applying roll running on top of the cards in line with its applying roll, said applying rolls being operated from said card feeding mechanism.

WILLIAM C. DIEFENBACH.

Witnesses:
 WM. A. COURTLAND,
 GEO. E. BARBER.